E. Towns,
Governor.
Nº 59,877. Patented Nov. 20, 1866.
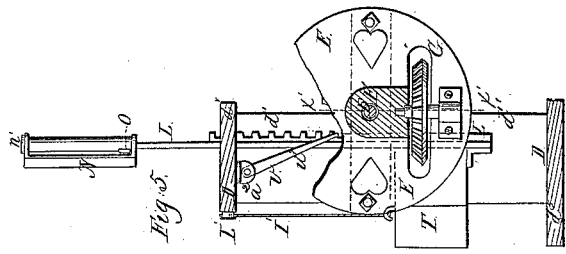
Fig. 5.
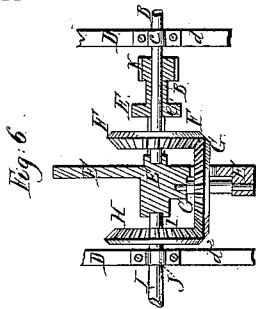
Fig. 6.
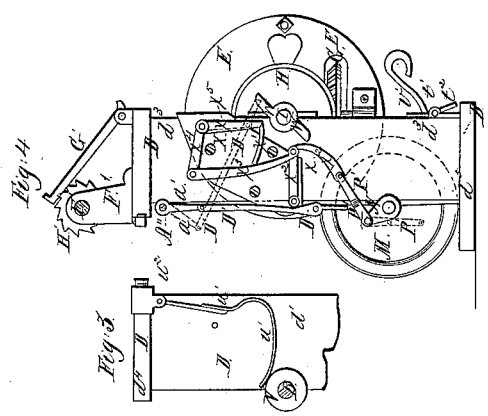
Fig. 4.
Fig. 3.
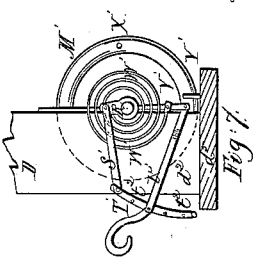
Fig. 7.
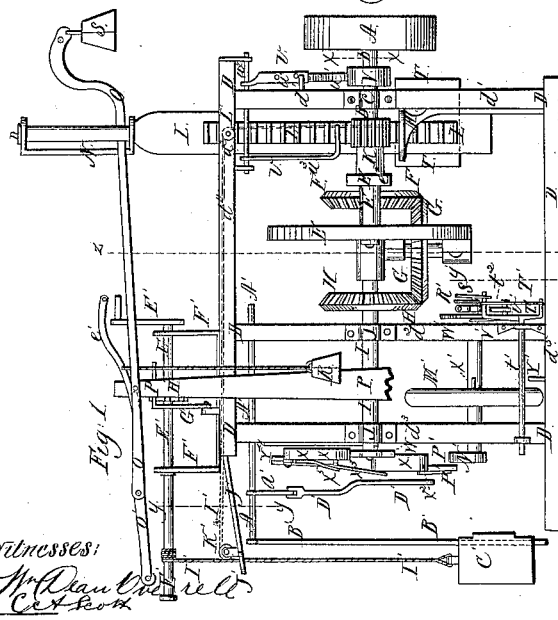
Fig. 1.
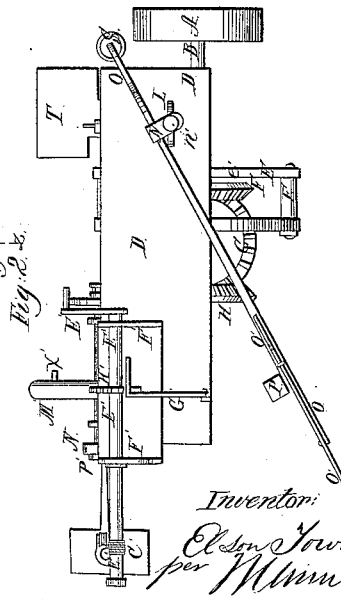
Fig. 2.
Witnesses:
Inventor:
Elson Town
per Munn & Co. atty.

United States Patent Office.

IMPROVEMENT IN VIBRATING GOVERNORS.

ELSON TOWNS, OF MORLAND'S GROVE, ILLINOIS.

Letters Patent No. 59,877, dated November 20, 1866.

SPECIFICATION.

TO ALL WHOM IT MAY CONCERN:

Be it known that I, ELSON TOWNS, of Morland's Grove, in the county of Wayne, and State of Illinois, have invented a new and useful Improvement in Pendulum or Vibrating Governor; and I do hereby declare that the following is a full, clear, and exact description thereof, which will enable others skilled in the art to make and use the same, reference being had to the accompanying drawings, forming part of this specification, in which—

Figure 1 is a side view of my improved governor.

Figure 2 is a top view of the same.

Figure 3 is a detail view, partly in section, through the line $x\,x$, fig. 1.

Figure 4 is an end view of the same, partly in section, through the line $y\,y$, fig. 1.

Figure 5 is a vertical section taken through the line $z\,z$, fig. 1, part of the frame or box being broken away.

Figure 6 is a detail sectional view taken through the line $x^1\,x^1$, fig. 5.

Figure 7 is a detail view, partly in section, through the line $y^1\,y^1$, fig. 1.

Similar letters of reference indicate like parts.

My invention has for its object to furnish an improved governor for regulating the velocity of machines driven by steam, wind, or water power; and it consists, first, in the combination of the pulley, pinion-wheel, bevel gear-wheels, and frame or box, with each other, with the driving and verge-wheel shafts, with the rack, and with the frame of the machine, for the purpose of obtaining the difference between the motion of the machine to be governed, and the required motion; second, in the combination of the jointed verge with the verge-wheel with the pendulum and vibrating-wheel, either or both, and with the frame of the machine; third, in the combination of the spring, pitman, lever, and vibrating-frame, with each other, with the vibrating-wheel, and with the frame of the machine; fourth, in the combination of a pawl, ratchet-wheel, windlass and cord, with each other, with the frame of the machine, and with the pendulum weight; fifth, in the combination of the spring-catch and pulley with the driving-shaft, with the rack, and with the frame of the machine; sixth, in the combination of a jointed lever and stirrup with the rack and with a fulcrum-post; the whole being constructed and arranged as hereinafter more fully described.

A is the driving-pulley, around which passes a band connecting it to the machine to be governed. The pulley A is attached to the end of the driving-shaft B, which revolves in bearings C, attached to the post $d^1$ of the frame D of the machine, and the other end of which revolves in a socket formed in the hub of the frame or box E. F is a bevel gear-wheel attached to the end of the driving-shaft B, as shown in fig. 6, the teeth of which mesh into the teeth of the bevel gear-wheel G pivoted to the frame or box E, and impart motion to said wheel. The teeth of the bevel gear-wheel G mesh into the teeth of the bevel gear-wheel H attached to the end of the verge-shaft I, as shown in fig. 1. The shaft I revolves in bearings J, attached to the posts $d^2$ and $d^3$ of the frame D, and its end enters and revolves in a socket formed in the hub of the wheel or frame E. The frame E is thus supported upon and pivoted to the ends of the shafts B and I. K is a pinion-wheel attached to the part $e^1$ of the frame E, which revolves loosely upon the shaft B, and the teeth of which mesh into the teeth of the rack L. The rack slides up and down through the top piece $d^4$ of the frame D, and is kept in place by the guide M attached to the post $d^1$ of the frame D, as shown in fig. 1. To the top of the rack L is attached a stirrup, N, through which passes the end of the lever O. The lever O is pivoted to the fulcrum-post P, and is jointed or has a short lever, $o^1$, pivoted to its end. One end of the part $o^1$ is connected to the valve or gate that regulates the power, and from the other end is suspended a weight, R, to hold the said part in its place. S is a weight suspended from the end of the lever O to hold it to its place. The stirrup N is made adjustable by being secured to the rack L by a screw, $n^1$, as shown in figs 1, 2, and 5. This enables the machine and fulcrum-post, P, to be set in any desired position to accommodate the positions of the power and machine whose motion is to be governed. T is a weight attached to the rack L, as shown in fig. 2, which draws said rack down and operates the valve whenever the motion of the machine to be governed stops or becomes too slow. V is a spring-catch, the spring, $u^1$, of which rests upon the pulley V attached to the shaft B, and its upper end is attached to the part, $u^2$, which works in supports attached to the frame D, as shown in figs. 1 and 3. The catch $u^3$ is attached to the part $u^2$, and hangs down in front of the rack L, as shown in figs. 1 and 5. Whenever the pulley A runs back, the pulley V operates the spring-catch U, bringing the catch $u^3$ in contact with the teeth of the rack L, holding the said rack securely in such position, as shown in fig. 5. W is the verge-wheel, which is attached to the end of the shaft I, as shown in fig. 1. The verge-wheel W has two points or arms, as shown in fig. 4, each of which operates each part of the jointed verge, X, at each revolution of the said wheel, W, thus communicating four vibrations to the pendulum or vibrating-wheel at each revolution of the said verge-wheel W. X is the jointed verge, both parts, $x^1$ and $x^2$, of which are pivoted to the side of the post $d^3$ of the frame D, as shown in fig. 4, in such positions that they may both be acted upon by the arms or points of the verge-wheel W. The parts $x^1$ and $x^2$ are connected to each other by the pitman, $x^3$, the lower end of which is pivoted to the angle of the part $x^2$, and its other end is pivoted to the end of the arm $x^4$, rigidly attached to the part $x^1$. $A^1$ is the pendulum-shaft, which works in bearings attached to posts $d^2$ $d^3$ of the frame D. To the end of the shaft $A^1$ is attached the pendulum-rod $B^1$, which passes through a slot in the pendulum-weight $C^1$, as shown in dotted lines in fig. 1. $a^1$ is an arm rigidly attached to the shaft $A^1$, and to the lower end of which is pivoted the upper end of the pitman $D^1$, which connects the pendulum to the jointed verge X. Through the lower end of the pitman $D^1$ is formed a hole, and from the side of the upper part, $x^1$, of the verge X, projects a pin, upon the end of which rests one end of a spring, $x^5$, and the connection is made by slipping the end of the pitman under the spring $x^5$ so that the said pin may pass through the hole in said pitman. $E^1$ is a windlass working in supports, $F^1$, attached to the frame D, as shown in fig. 1. $G^1$ is a pawl pivoted to the frame D, and taking hold of the teeth of the ratchet-wheel $H^1$ attached to the windlass $E^1$, to hold said windlass in any position in which it may be placed. $I^1$ is a cord, one end of which is attached to a hook upon the shaft of the windlass $E^1$, and its other end passed down through a hole in the guide-rest $J^1$, and is attached to the pendulum-weight $C^1$, so that by operating the windlass $E^1$ the said weight may be raised or lowered, and the rapidity of the motion thus increased or diminished as desired. When desired, the cord $I^1$ may be removed from the shaft of the windlass $E^1$, passed over the pulley $K^1$, thence carried along the top piece $d^4$ of the frame D, over the pulley $L^1$ attached to said top piece, and secured to a hook attached to the rack-weight T, as shown in red in figs. 1 and 5. This arrangement is designed to govern a saw to run fast while sawing and slow while not sawing, regulating the motion according to the power required. $M^1$ is a vibrating-wheel, the axles of which work in bearings attached to the posts $d^2$ and $d^3$ of the frame D. To one end of the axle of the wheel $M^1$ is attached a crank, $N^1$, to the end of which is pivoted one end of the arm $P^1$, having a small spring, $p^1$, attached to it, the end of which rests upon the end of a pin projecting from the side of said arm. Through the lower end of the part $x^2$, of the jointed verge X, is formed a hole through which is passed the pin on the arm $P^1$, thus connecting the jointed verge X to the vibrating-wheel $M^1$. To the other end of the axle of the vibrating-wheel $M^1$ is attached a crank, $R^1$, to the end of which is pivoted one end of the pitman $S^1$, the other end of which is pivoted to one end of the vibrating-frame $T^1$, the shaft $t^1$ of which works in bearings secured to the posts $d^2$ and $d^3$ of the frame D, as shown in fig. 1. $U^1$ is a lever having a pin, with the end of a small spring resting upon its end, in the manner before described. This lever is connected to the vibrating-frame $T^1$ by passing the said pin through one or the other of the holes through the bar $t^2$ of the said frame, according as the motion of the vibrating-wheel $M^1$ is desired to be faster or slower. The other end of the lever $U^1$ is pivoted to the lower end of the arm $V^1$, the upper end of which works loosely upon the axle of the vibrating-wheel $M^1$. $W^1$ is the spring that regulates the movement of the vibrating-wheel $M^1$. One end of the spring $W^1$ is securely attached to the axle of the wheel $M^1$, and the other end to the lower part of the arm $V^1$, as shown in fig. 7. The vibration of the wheel $M^1$ is also limited by the stop-pins $X^1$ projecting from the side of the rim of said wheel, as shown in figs. 1, 2, and 7, which said pins come in contact with the pin $S^1$ projecting from the sill $d^5$ of the frame D, and prevent the said wheel from revolving too far.

It will be observed that either the pendulum or the vibrating-wheel, or both, may be used to mark the required velocity. And it should be remarked that when the pendulum alone is used the upper part, $x^1$, of the jointed verge, X, may be attached directly to the pendulum-shaft $A^1$. It should also be observed that the rack L, that regulates the application of the power, is operated by the difference between the required motion and the actual motion of the machine to be governed, being raised if said machine runs too fast, and lowered if it runs too slow.

What I claim as new, and desire to secure by Letters Patent, is—

1. The combination of the pulley A, pinion-wheel K, bevel gear-wheels F, G, H, and frame or box E, with each other, with the driving-shaft B, the verge-shaft I, the weighted rack L, and the frame D of the machine, substantially as described, for the purpose of obtaining the difference between the required and actual velocity, and the application of said difference as herein set forth.

2. The combination of the jointed verge X, constructed as described, with the verge-wheel W, with the pendulum $B^1$, $C^1$, and vibrating-wheel $M^1$, either or both, and with the frame D of the machine, substantially as described and for the purpose set forth.

3. The combination of the spring $W^1$, pitman $S^1$, lever $U^1$ and vibrating-frame $T^1$, with each other, with the vibrating-wheel $M^1$, and with the frame D of the machine, substantially as described and for the purpose set forth.

4. The combination of the pawl $G^1$, ratchet-wheel $H^1$, windlass $E^1$, and cord $I^1$, with each other, with the pendulum-weight $C^1$, and with the frame D of the machine, substantially as described and for the purpose set forth.

5. The combination of the spring-catch U and pulley V with the driving-shaft B, with the rack L, and with the frame D of the machine, substantially as described and for the purpose set forth.

6. The combination of the jointed lever O, $o^1$, and stirrup N, with the rack L, and with the fulcrum-post P, substantially as described and for the purpose set forth.

ELSON TOWNS.

Witnesses:
Thos. C. Stanley,
John Coulson.